(12) United States Patent
Phattaranawik et al.

(10) Patent No.: US 9,133,044 B2
(45) Date of Patent: Sep. 15, 2015

(54) METHOD AND DEVICE FOR THE TREATMENT OF WASTE WATER

(75) Inventors: Jirachote Phattaranawik, Trondheim (NO); Tor Ove Leiknes, Trondheim (NO)

(73) Assignee: BioWater Technology AS, Tønsberg (NO)

( * ) Notice: Subject to any disclaimer, the term of this patent is extended or adjusted under 35 U.S.C. 154(b) by 650 days.

(21) Appl. No.: 12/864,883

(22) PCT Filed: Jan. 28, 2009

(86) PCT No.: PCT/NO2009/000032
§ 371 (c)(1),
(2), (4) Date: Jul. 28, 2011

(87) PCT Pub. No.: WO2009/096797
PCT Pub. Date: Aug. 6, 2009

(65) Prior Publication Data
US 2012/0006744 A1    Jan. 12, 2012

(30) Foreign Application Priority Data

Jan. 28, 2008  (GB) .................................. 0801518.2
Jan. 28, 2008  (NO) .................................. 20080493

(51) Int. Cl.
*C02F 3/30*       (2006.01)
(52) U.S. Cl.
CPC ..................................... *C02F 3/301* (2013.01)
(58) Field of Classification Search
CPC ...................................................... C02F 3/301
USPC .......... 210/605, 615, 616, 617, 621, 622, 630, 210/903, 150, 151, 252, 259, 260
See application file for complete search history.

(56) References Cited

U.S. PATENT DOCUMENTS 4,350,588 A      9/1982   Tsubota
4,800,021 A  *   1/1989   Desbos ......................... 210/605
(Continued)

FOREIGN PATENT DOCUMENTS

CA          2542894 A1    10/2007
DE          44 11 825     10/1995
(Continued)

OTHER PUBLICATIONS

Goncalves et al., Water Science and Technology, vol. 38, No. 8-9, 1998, pp. 189-195, XP002523125 (English abstract provided).
(Continued)

*Primary Examiner* — Fred Prince
(74) *Attorney, Agent, or Firm* — Winstead PC

(57) ABSTRACT

The invention relates to a reactor for treatment of waste water for being subject to both anoxic/anaerobic and aerobic treatment within one single reactor volume. The anoxic/anaerobic reaction zone is separated from the aerobic reaction zone by a separator which also works as a hydrodynamic separator between the two reaction zones. The reactor makes it possible that the effluent water has a lower proportion of suspended solids and also that it produces less sludge than reactors of comparison. The reactor is further more energy efficient than prior art reactors. Several reactors according to the invention may be arranged in parallel so as for the inlet waste water may be treated in a modular way, and thus allowing the maintenance of the units to be facilitated.

22 Claims, 5 Drawing Sheets

(56) References Cited

U.S. PATENT DOCUMENTS

| | | | |
|---|---|---|---|
| 5,788,838 A * | 8/1998 | Yamasaki et al. | 210/150 |
| 5,972,219 A | 10/1999 | Habets et al. | |
| 6,063,273 A | 5/2000 | Habets et al. | |
| 6,086,765 A * | 7/2000 | Edwards | 210/605 |
| 6,132,602 A | 10/2000 | Luehr | |
| 2001/0027948 A1 * | 10/2001 | Tipton et al. | 210/629 |
| 2002/0139747 A1 | 10/2002 | Gantzer | |
| 2003/0057152 A1 * | 3/2003 | Haridas | 210/603 |

FOREIGN PATENT DOCUMENTS

| | | |
|---|---|---|
| DE | 197 17 758 | 10/1998 |
| DE | 197 58 486 | 1/1999 |
| EP | 0 428 537 | 9/1992 |
| JP | 61-274798 | 12/1986 |
| JP | 1-231994 | 9/1989 |
| JP | 9-253687 | 9/1997 |
| NO | 320361 | 11/2005 |
| WO | 91/11396 | 8/1991 |
| WO | 94/16999 | 8/1994 |
| WO | 03072513 A1 | 9/2003 |
| WO | 2006137736 A3 | 12/2006 |

OTHER PUBLICATIONS

International Search Report dated May 7, 2009, from corresponding PCT application.

British Search Report, Dated May 22, 2008, in Application No. GB0801518.2.

* cited by examiner

METHOD AND DEVICE FOR THE TREATMENT OF WASTE WATER

INTRODUCTION

The present invention relates to a method for treating wastewater wherein the wastewater is arranged for being treated in a single reactor generally comprised of two reaction zones. The reactor is arranged for treating water both anoxially/anaerobically and aerobically within a single reactor volume. According to the invention the reactor is particularly well-adapted for treating industrial, municipal, agricultural or other wastewater. This entails that preferably a large proportion of the suspended solids should be removed from the feed-water, as well as removing as much as possible of any biological material in the treated effluent from the reactor. The reactor according to the invention is arranged for reducing a suspended solid in the treated effluent from the reactor and thus reducing the need of post treatment processes of the effluent such as physical/chemical sedimentations, reducing a water consumption for cleaning the reactor and the post treatment process and significantly reducing a use of chemicals for post treatment, as well as facilitating maintenance of the reactor. The reduction in water and chemical use is of particular interest from an environmental point of view. The reactor according to the invention is further arranged for reducing amount of excess aerobic sludge and thus reducing the need for post treatment of sludge disposal such as conventional sludge dewatering, conventional sludge stabilizer, chemical disinfection or other post-treatment techniques. Due to the novel and inventive reactor design, the present invention may also reduce the energy requirements for treating water.

BACKGROUND OF THE INVENTION

Biological reactors or bioreactors have been widely used to biologically degrade contaminants such as biological-consumable organic or inorganic substances in municipal and industrial wastewaters in treatment systems. Typically, there are two types of biological reactors commercially used: i) activated sludge reactors, and ii) biofilm reactors. Conventional designs for biological wastewater treatment systems using conventional activated sludge and biofilm reactors require a unit for sludge or particle separation to remove some suspended solid in the effluents from the reactors before the effluents are discharged to natural water reservoirs. The capital cost for the wastewater treatment systems and also operating costs such as electricity consumption and chemical use would be reduced if the particle separation unit was not required.

Periodic maintenance of conventional biological wastewater treatment systems results in additional cost and loss in clean effluent productivity. Moreover, aerobic biological reactors of activated sludge and biofilm for wastewater treatment systems necessitate extra management for sludge disposals and thus incur additional costs for the sludge handling system. The excess sludge from the aerobic biological reactors of the background art is required to be properly managed and adequately disposed of.

High suspended solid concentrations in the effluents, high viscosities in the effluents, and excess sludge management in the conventional aerobic activated sludge biological reactors cause operational difficulties and incur extra capital costs of overall wastewater treatment systems and clean water production systems.

The present invention is arranged for handling at least some of the problems resulting from high suspended solid and excess aerobic sludge production in the feedwater treatment systems and thus to significantly reduce the costs of operation and maintenance in biological feedwater treatment systems.

The present invention provides a novel biological reactor designed to control the suspended solid in the reactor, to reduce amount of excess aerobic sludge produced from aerobic digestion, and to produce an effluent having a relatively low concentration of suspended solids.

General Biological Background

The composition of the wastewater may vary from one wastewater producing society to another, and depends on the water quality, the use and conservational practices, cultural attributes, industrial activity and kinds of industrial treatment executed on site. One problem caused by spilling raw wastewater to a recipient is eutrophication of the recipient due to the introduction of nutritional substances (nitrogen, phosphorus and organic matter) which are limiting factors for biological growth. Spilling raw wastewater to the environment incurs the risk of spreading of pathogenic organisms and accumulation and storage of various heavy metals. Biological reactors are used to biodegrade organic or inorganic substances in municipal and industrial wastewaters in treatment systems.

Anaerobic/anoxic wastewater treatment is the biological treatment of wastewater generally without supplying air or elemental Oxygen. The organic compounds of the wastewater may be converted by anaerobic/anoxic micro organisms and produce gas containing a large proportion of methane and some carbon dioxide, known as biogas.

Denitrification takes place in an anaerobic/anoxic environment by anaerobic/anoxic bacteria. The denitrification process in an anoxic environment may convert Nitrite/Nitrate to Nitrogen gas which is generally harmless if released to the atmosphere. Nitrate, which may be undesired in the effluent and readily leached to the ground water where it may play an important role in europhication processes.

In the wastewater engineering field organic substances may be measured by the amount of oxygen it takes to oxidize it chemically. This amount of oxygen is referred to as the "chemical oxygen demand" (COD), which is basically a measure of organic matter content or concentration. A large fraction of COD in wastewater may be biodegradable and thus converted to sludge, which is expensive to remove and requires post-treatment. An aerobic wastewater treatment facility is essentially a "waste sludge factory". Oxygen must continuously be supplied by aerating the wastewater at the great expense of energy to operate the aerators.

Nitrification may take place in the biological aerobic zone. Nitrification is the biological oxidation of ammonia with oxygen into Nitrite followed by the oxidation of those Nitrites into Nitrates.

A main problem addressed by the present invention is that the amount of undesired components in wastewater should be reduced in order to prevent pollution by the effluent outlet.

TECHNICAL BACKGROUND ART

A large number of existing water treatment systems are already in use and known in the background art. Some of the most pertinent with respect to the present invention are described below.

German patent publication DE19758486A1, "Method and device for biological removal of Nitrogen from wastewater", describes a vertical tank reactor comprising an anaerobic reaction zone in the lower portion and an aerobic reaction zone in the upper portion. The two reaction zones are separated by a horizontal nozzle plate of which purpose is to prevent sludge from the upper, aerobic zone to migrate to the lower, anaerobic zone. Anaerobic reactions take place in a dense filter of small particle size, which filter fills the diameter of the tank. Aerobic reactions take place in a less dense filter of large particle size, which also fills the diameter of the tank. Wastewater is pumped in through a bottom inlet and into the lower filter, in the anaerobic zone. The lower filter collects waste particles and allows water with produced Nitrogen gas to pass upward into the upper, coarser filter in the aerobic zone. An air line pumps oxygen into the tank below the upper filter. The aerobic processes that take place in the upper filter make a larger proportion of sludge. Waste from the lower filter and from the upper filter is removed by halting the entire process of the tank, and using the upper clean water reservoir to flush the entire system in the direction of gravity, and draining the tank through the bottom inlet, which is now an outlet.

Japanese patent abstract JP01231994 published 18.09.1989: "Sewage treating equipment", also describes a vertical tank for upward flow of wastewater through a lower anaerobic reaction filter bed zone and further through an upper, aerobic reaction zone. Gases such as Nitrogen and Carbon dioxide which may form in the lower, anaerobic reaction zone are trapped by a so-called partition wall which is constituted by a double concentric funnel-shaped device above the anaerobic filter bed. The gases are deviated out from the tank through a gas line from the upper parts of the funnel device. Water from the lower, anaerobic reaction zone passes up through the funnel-shaped partition wall and into an upper, aerobic filter bed reaction zone which is provided by oxygen from below by an oxygen line just above the funnel-shaped partition wall. The water is treated by aerobic organisms adhered to the suspended material in the filter bed material in the aerobic zone. The filter bed material must either be cleaned or exchanged. The outflow of such suspended filter bed material is prevented by a filter bed outflow preventing net at the top of the upper filter bed. Purified water is collected from above the upper preventing net.

Japanese patent abstract JP09253687 published 30.09.1997, "Anaerobic and aerobic treatment and apparatus for waste water", also describes a vertical tank arrangement. The water is led upwards from the lower, anaerobic packed zone to the upper, anaerobic packed zone and an outlet for purified water is arranged at the top. An aeration device forms the separation between the upper, aerobic zone and the lower anaerobic zone. A stirring apparatus is arranged below the lower packed bed.

U.S. Pat. No. 6,063,273 published 16 May 2000, "Apparatus for the biological purification of waste water" also describes a vertical tank arrangement with a lower anaerobic zone, a so-called UASB-reactor, and a partition separating the lower zone from an upper aerobic zone. Anaerobic effluents are allowed to pass upwards through the partition and into the aerobic reaction zone. A gas collection trap is arranged above the anaerobic zone. A flotation separator is arranged on the aerobic reactor for separating biomass from the purified water. The excess biomass produced in the aerobic zone described in this U.S. patent will follow the excess water running from the bottom of the aerobic zone and upwards through a pipe to a flotation chamber, in which air bubbles bring the excess biomass as flocks to the water surface of the flotation chamber. At the surface, the flocks are allowed to run off via a skimmer arrangement through a centrally arranged sludge tank trunk channel and are removed from the system. U.S. Pat. No. 6,063,273 mentions particularly in col. 1, lines 47-50: "As the result of the fact that the flow in the aerobic reactor may be fairly turbulent, the anaerobic biomass cannot sink back into the anaerobic reactor, which adversely affects the purification efficiency". Further, from lines 59-65 we quote "The partition ensures, inter alia, that the anaerobic sludge does not end up in the aerobic reactor and the aerobic sludge cannot sink into the anaerobic reactor." The cited phrases show that the two reaction zones are strictly separated, and that they do not exchange material. For removing the excess aerobic biomass produced from the purified liquid, a flotation separation apparatus is mounted on top of the aerobic reactor.

Norwegian patent NO320361 describes a modified upward flow sludge blanket reactor which has the additional feature relative to the above mentioned UASB reactors of having an oxygen supply line also below the anaerobic zone. Use of the additional oxygen line may promote growth of a facultative biomass and an aerobic biomass, thus the processes in the reactor may be run alternating in anaerobic and aerobic modes, which may be used during changing conditions during the year.

There are some disadvantages which are common to all the five above-mentioned apparati. The sludge produced in the lower, anaerobic zone is removed from the tank separately from the sludge produced in the upper, aerobic zone. As the two zones are separated, and the aerobic zone is not pure, much oxygen is required, which requires much energy. Sludge produced in the aerobic zone must generally in the background art be removed mechanically from the top of the aerobic zone, or filters for removing sludge from the purified water must be cleaned regularly. There is a general risk of undesired growth in pipes.

A disadvantage of the background art among other factors is the production of suspended solids and other chemicals. Such components may incur undesired eutrophication.

The background art shows that several reactors used in wastewater treatment make use of UASB (upward-flow anaerobic sludge blanket)—reactors comprising separate anaerobic and aerobic zones where the through-put is vertical upwards. UASB reactors are characterized by having two zones separated by a barrier in such a way that down-flow of matters from the aerobic zone to the anaerobic zone is prevented, such as a nozzle plate, a partition wall, a filter, or a separation zone combined with a perforated plate.

U.S. Pat. No. 6,132,602 describes an upward flow vertical reactor for the treatment of wastewater. The publication describes the violent agitation and consequent distribution of biological matter within the wastewater to be treated in combination with a very large oxygenation of the wastewater by pumping in a large amount of air and bubbling it through the system. The fine distribution of biological matter within the treatment section allows an increased contact area between the biological treatment agents and the heavily oxygenated wastewater. The treated water and biological material should then flow down externally to the main treatment element, whereupon the biological material should settle and be treated anaerobically in a sludge zone, and the wastewater be recycled. One of the major objectives according to that U.S. patent is to distribute the biological material in such a manner that it does not agglomerate. A major drawback to U.S. Pat. No. 6,132,602 is firstly that the finely distributed biological material will not easily settle into the sludge zone. The active distribution of the biological material to avoid agglomeration will counteract the removal of some of the suspended solids. Accordingly there is need of a second settling zone, complicating the design. Furthermore, even a second settling zone will not adequately remove all suspended solids, and further treatment of the effluent will be needed. Such a design further presents the disadvantage of having to bubble a large amount of air through the system, thus being energy intensive. Moreover, U.S. Pat. No. 6,132,602 calls for installing a number of disc elements and channels into the reactor space, thus both increasing capital expenditure, and reducing the available reactor volume.

WO9416999 pertains to a secondary water treatment system wherein a single reactor is provided and wherein a plurality of reaction zones are situated. There are three main zones in the reactor, wherein the lowermost zone 9 is a sludge collecting zone, a next-lowest zone 10 is an anoxic settling zone, above of which is a zone 11 being a mixing and aeration zone through which the wastewater is pumped, and provided with floating balls 17 which are buoyant plastic balls on which bacterial media are to attach themselves. However the buoyant balls merely delimit the tank into three zones, wherein only the topmost area of the tank is the zone wherein the reaction takes place. The flow within the aerobic zone is directed downwardly, and the anaerobic activated sludge will not contribute to the treatment of the wastewater. Furthermore, this reactor functions according to the air lift method, and is thus rather energy intensive. The effluent will also comprise quite a large amount of suspended solids due to the violent agitation of the wastewater.

EP0428537 describes a process for the biological purification of wastewater by an activated sludge method, wherein the wastewater is contacted with micro-organisms in anoxic and aerobic treatment zones, respectively, by being alternatingly introduced into said treatment zones. However this method necessitates a subsequent treatment in an additional, separate aerobic treatment zone followed by introducing the water in a clarifying basin. Thus EP0428537 requires four separate volumes for treating the water, thereof two aerobic treatment volumes.

WO9111396 pertains to a system and method for the production of so-called "biofilm carriers" and a subsequent treatment of wastewater thereby.

Review articles such as "Moving-medium biofilm reactors" by Rodgers and Zhan Reviews in Environmental Science and Biotechnology 2: 213-224 2003, and "Development of anaerobic sludge bed (ASB) reactor technologies for domestic wastewater treatment: motives and perspectives" by Kalago and Verstraete, World journal of Microbiology & Biotechnology 15:523-534, 1999, show some of the various approaches to wastewater treatment which are either in use or are beginning to be implemented. It is worth mentioning the Rotating Biological Contactors (RBC) and the Vertically Moving Biofilm Reactors discussed by Rodgers and Zhan. Both methodologies differ widely from the reactor as discussed in the present application. The authors further discuss the method known as Moving Bed Biofilm Reactors wherein use is made of carriers as discussed in WO9111396.

Kalago and Verstraete discuss various methods for anaerobic treatment of wastewater but are less concerned with the aerobic post treatment of the resulting effluent. Amongst the methods discussed are the use of upflow anaerobic sludge blanket reactor (UASB) as well as septic constructed upon the same principle, expanded granular sludge bed (EGSB), hydrolysis upflow sludge bed (HUSB) and variants thereupon. As is noted there is a general need for a subsequent aerobic system for post-treatment of the effluent in order to effect nutrient and pathogen removal. The post-treatment systems may be quite substantive and examples comprise facultative lagoons and oxidation ponds.

Gonçalves et at in Water Science and Technology, Volume 38, Issues 8-9, 20 Nov. 1998, Pages 189-195 present a method for a two step treatment of wastewater using a combination of an Upflow Anaerobic Sludge Blanket (UASB) reactor and a submerged biofilter. The submerged biofilter is mainly a polishing step for the effluent after the wastewater has been treated in the UASB, and the described method illustrates the complexity of the background art systems. The submerged biofilter does not form a part of the UASB reactor, it will require separate sludge handling, and there is no circulation between the anaerobic process and the submerged biofilter.

SHORT SUMMARY OF THE INVENTION

The present invention seeks to overcome the above described problems concerning reductions of amount of excess aerobic sludge and high solid concentration in the reactor effluent, and comprises: A reactor tank for the biological treatment of contaminated water as defined in the attached independent device claim 1. The invention further comprises a method for treating a contaminated feedwater stream is defined in the attached independent method claim 11. The invention further comprises the use of said reactor tank for the treatment of both municipal, industrial, agricultural, and aquaculture wastewater such as defined in claims 20, 21, 22, and 23, respectively.

For starting the reactor according to the invention it is believed that conventional methods of starting biological reactors can be used, i.e. seeding of the reaction zones, or conditioning by letting wastewater run into the reactor tank at set operating conditions. Anaerobic/anoxic organisms already present in the wastewater will grow in the lower, anaerobic/anoxic zone and aerobic organisms present in the wastewater will establish in the aerobic zone. As the anaerobic/anoxic processes and aerobic processes are established and exchange matter, and waste water is fed slowly into the system, the overall effect of the process is that effluent of good quality will flow out from the aerobic zone, and the excess aerobic sludge will be collected in the anaerobic/anoxic zone from which the sludge waste may be removed.

Advantages of the Invention, and Solutions to Some Problems of the Prior Art

A first advantage of the invention is mainly to treating water both under anoxic/anaerobic conditions and under aerobic conditions within a single reactor volume. A large proportion of the suspended solids in the feed water and the effluent will be removed biologically and hydrodynamically. In the present invention, the biological material produced in the upper, aerobic zone is allowed to become exposed for the lower, anaerobic/anoxic zone and thus reduces the amount of total aerobic sludge mass produced, as opposed to the devices of the background art where organic matter produced in the aerobic zone is prevented from falling down into the anoxic/anaerobic zone. In the present invention, the biological material produced in the upper, aerobic zone is allowed to become exposed to the lower, anaerobic/anoxic zone and thus reduces the total sludge mass produced. A very large proportion of biomass grown in the aerobic zone is conducted down to be reprocessed in the anaerobic/anoxic zone, eventually producing sludge waste.

A second advantage of the invention is a more efficient decomposition of organic compounds from the feed water, that results in reduced amount of sludge waste produced and thus reduced pollution to the environment. This will result in less clogging problems within the reactor, thus reducing the need for post treatment of sludge disposal such as conventional sludge dewatering, conventional sludge stabilizer, chemical disinfection or other post-treatment techniques.

A third advantage of the invention over the background art, is the eventual removal of sludge occurs from the anaerobic/anoxic zone, which disposes of the need to remove sludge from the upper, aerobic zone.

A fourth advantage of the invention is to mainly reducing inorganic and organic chemicals, and solid particles in the treated water, reducing the risk of eutrophication in the recipient.

A fifth advantage of the invention is that the residence time of the sludge in the anaerobic/anoxic reaction zone is increased, and thus more time is available for gravitational compression and stabilization of the sludge, such that the resulting sludge volume is reduced.

A sixth advantage of the invention is a reduced requirement of oxygen and thus a reduced need for energy consumption for pumping air to the bubble diffuser to release oxygen bubbles to below the aerobic zone.

A seventh advantage of invention is to achieve improved water quality while using less energy.

An eight advantage of the invention is that while the separating structure guides falling biomass particles produced in the aerobic zone down into the anaerobic/anoxic zone, the same separating structure guides upwards flowing water from the anaerobic/anoxic zone to the aerobic zone and prevents Oxygen from diffusing into the anaerobic/anoxic zone.

A ninth advantage of the invention is that due to the good quality of the effluent with relatively low suspended solid concentrations, potentially reducing the need for post-treatment, depending on the intended use of the effluent. This will result in reduced capital costs of post-treatment processes associated with the reduced need for chemicals used in the post-treatment processes.

A tenth advantage of the invention is that even though biomass is produced in the upper, aerobic reactor zone, this biomass is transported by gravity to the lower, anaerobic/anoxic reactor zone so as for the main decomposition of excess aerobic biomass and production of sludge waste to take place in the anaerobe/anoxic zone. The residence time of the biomass and sludge within the lower reaction zone may be controlled by periodic or continuous sludge removal from the lower, anaerobe/anoxic zone and may be adapted such that there is sufficient time for the compaction and stabilization of the sludge. This will result in a lower sludge waste volume and thus further result in reduced post-treatment costs associated with the reduced need for post-treatment and reduced requirement for transport of the sludge waste as the mass is reduced.

A further advantage of the present invention is that as opposed to the background art which requires an outlet for sludge produced in the upper, aerobic zone, the present invention requires no outlet for sludge removal from the aerobic zone.

The reactor of the invention is arranged for treating water both anaerobically/anoxically and aerobically within a single reactor volume. The background art describe one-way flow processes for the biological purification of wastewater being sequentially introduced into treatment zones as distinct from the present invention where the reactor comprises an integrating process in the same volume and where biomass in the aerobe zone being directed to the anaerobic/anoxic zone for further treatment by the means of the advantageous self-driven hydrodynamic circulation.

The aerobic treatment of wastewater according to prior art may be an energy demanding process, in which a large amount of aerobic sludge is formed. Anaerobic/anoxic sludge treatment may demand less energy. By combining these two aerobic and anaerobic/anoxic systems in the same reactor volume and utilizing gravity for transporting selected components in selected directions, one may obtain advantages from both environments and at the same time reduce disadvantages of each system.

FIGURE CAPTIONS

The invention is illustrated in the accompanying figure which should in no way limit the scope of the invention, said scope being limited solely by the claims.

FIG. 1 is an illustration of an embodiment of the reactor according to the invention. The feedwater inlet (1) is illustrated comprising a subsequent feedwater flow distributor (11). A possible sludge waste outlet (21) from the anaerobic/anoxic zone is illustrated. An effluent outlet (22) from the top of the upper section with the aerobic zone is shown. The lower anoxic/anaerobic reaction zone (31) may comprise an activated sludge and/or biofilm media (51). The upper aerobic reaction zone (32) comprises biofilm media (52). A separator structure (4) is arranged between the upper, aerobic reaction zone and the lower, anaerobic/anoxic reaction zone. In the illustrated embodiment, upper and lower screens (6) are arranged for delimiting the upper, aerobic reaction zone (32). A bubble diffusion device (7) is arranged above the separator structure (4) for releasing gas to the upper aerobic reaction zone (32). A recycle line (8) may be arranged. The flow direction of the feedwater is indicated, as has an inclination angle (8) for the separator structure. The flow directions have been indicated in order for showing some of the flow patterns within the reactor.

EMBODIMENTS ACCORDING TO THE INVENTION

Figure 1:
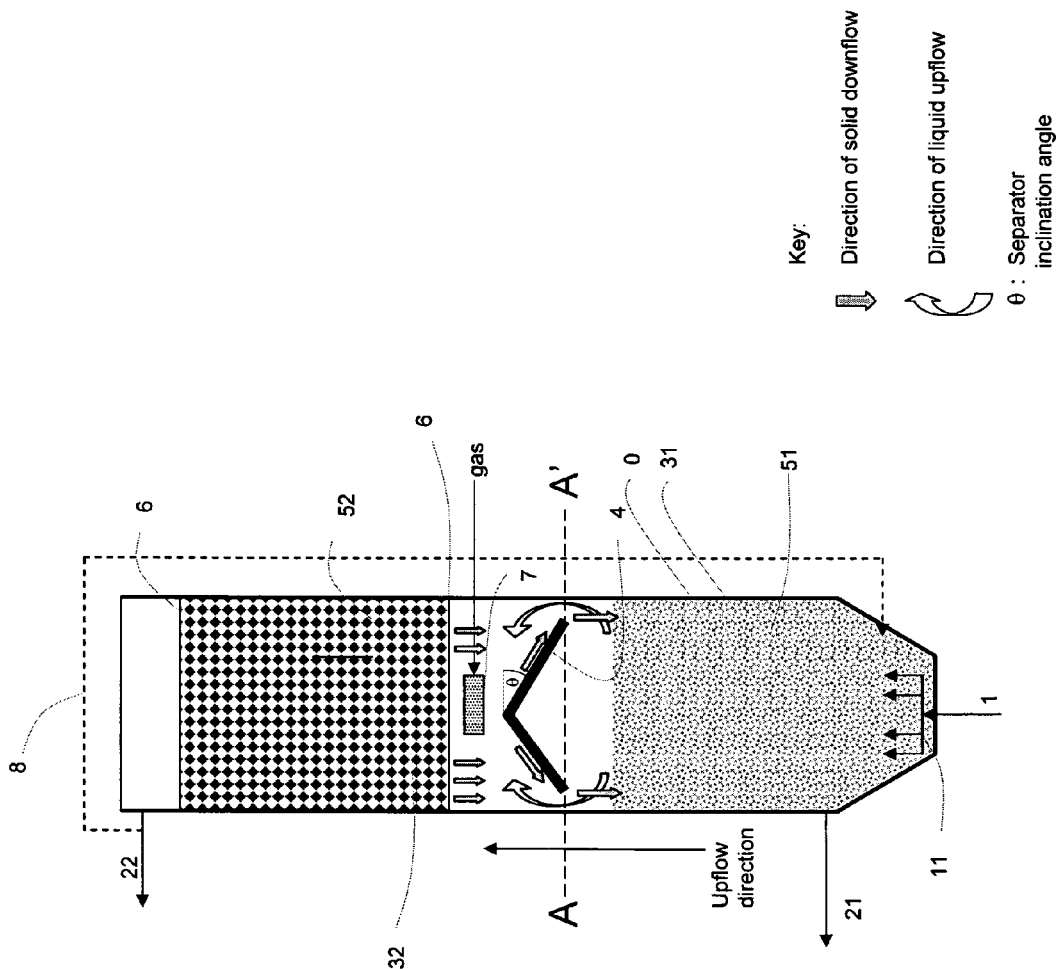

The invention will be described with reference to the attached figures the scope of the invention being solely limited by the enclosed claims.

The present invention presents a reactor wherein the reactor volume allows an anoxic/anaerobic treatment as well as an anaerobic treatment of feedwater to take place within said volume. The reactor tank (0) comprises inlets for the feedwater (1) to be treated, and outlets for effluent (22) and sludge (21). The inlets (1) for feedwater should be arranged at the lower end of the reactor tank (0) such that the feedwater passes through the sludge or possible biofilm media (51) arranged therein. This is an advantage as the feedwater will provide carbon to the anoxic/anaerobic reaction zone (31). The feedwater will as a consequence first be treated within the lower anoxic/anaerobic reaction zone (31).

In an embodiment of the invention the feedwater is distributed through a feedwater flow distributor (11) such that the feedwater flow is well distributed before flowing through the lower anoxic/anaerobic reaction zone (31). This will allow for a good distribution of organic carbon and nutrient substances in embodiments wherein the feedwater comprises organic carbon and nutrient substances which will be degraded and consumed by the anoxic/anaerobic biological material within the lower reaction zone (31).

The lower anoxic/anaerobic reaction zone (31) may comprise an activated sludge, biofilm media (51) or other biological agents for the anoxic/anaerobic treatment of the feedwater as well as for the stabilization of sludge and settling biomass from the upper aerobic reaction zone (32). In an embodiment of the invention there may be arranged a mixture of an activated sludge and biofilm media (51) for the anoxic/anaerobic treatment of the feedwater and sludge. The reaction mechanisms of the lower anoxic/anaerobic reaction zone (31) are well known in the art, and will as such not be described in detail in the present application. There are various treatment mechanisms which may be used such as an anoxic/anaerobic denitrification of the sludge within the lower reaction zone (31). Using a denitrification process the organic carbon comprised in the feedwater will as mentioned above serve as a carbon source for the reaction.

The lower reaction zone (31) is thus arranged for digesting and collecting excess sludge settling from an upper reaction zone (32) of the reactor. The residence time of the sludge within the lower reaction zone (31) may be controlled by periodic or continuous sludge purging through the sludge outlet (21) and may be adapted such that there is sufficient time for the stabilization of the sludge. This will result in a lower sludge volume and thus further to a reduced sludge volume resulting in lower post-treatment costs associated with the treatment of the sludge.

After having passed through the anoxic/anaerobic reaction zone (31), the feedwater will pass a separator structure (4), wherein the separator structure (4) has a variety of functions including keeping the lower anoxic/anaerobic reaction zone (31) separate from the upper aerobic reaction zone (32), preventing diffusion of oxygen from the upper aerobic reaction zone (32) to the lower anoxic/anaerobic reaction zone (31), as well as for directing biological material settling from the upper reaction zone (32) towards the lower reaction zone (31).

Above the separator structure (4) there is arranged the before mentioned upper aerobic reaction zone (32), wherein the feedwater undergoes an aerobic biological treatment. The feedwater treatment within the upper aerobic reaction zone (32) comprises a biological treatment of the feedwater by biological material arranged within the aerobic reaction zone (32).

The aerobic reaction zone (32) may comprise a plurality of aerated biofilm media (52) being kept in place using coarse screens (6), a fluidized bed comprising biofilm media, a fixed bed comprising media, or any other suitable method for carrying biofilm all of which should be considered to lie within the scope of the present application. The biofilm media as such are known from the art, and are not an object of the present invention. As the treatment of the feedwater within the upper reaction zone (32) takes place, biofilm will grow on the biofilm media (52). The resulting biofilm will after having reached a sufficient size fall or be sheared off the carriers (52) and the now free floating biological material will settle towards the lower section of the reactor. The separator structure (4) is arranged for directing the settling biological material towards the lower anoxic/anaerobic reaction zone (31) wherein the biological material will become part of the sludge comprised therein.

In the present invention the separator structure (4) may thus have more than one function. It shall keep the lower anoxic/anaerobic reaction zone separate from the upper aerobic reaction zone, preventing diffusion of oxygen from the upper aerobic reaction zone to the lower anoxic/anaerobic reaction zone. Further, it shall direct biological material settling from the upper reaction zone towards the lower reaction zone. The partly open separator integrates both the aerobic and the anaerobic/anoxic zones and controls the hydrodynamic flows in the bioreactor of the invention. By allowing mutual interaction of the process of anaerobic/anoxic active sludge in the anoxic/anaerobic zone and the further processing of anaerobic/anoxic digestion/decomposition of the settled aerobic biomass within the anaerobic/anoxic zone in which the anaerobic sludge uses the settled aerobic biomass as substances/nutrition for biological activities, and biologically anaerobic biomass production rate is significantly lower than the aerobic sludge production rate, therefore; the net amount of sludge and solid material so produced may be significantly reduced in the reactor and in the effluent water.

The microbial processes within the lower anoxic/anaerobic reaction zone (31) may in an embodiment of the invention comprise a denitrification process. This will result in nitrate and nitrites in the feedwater being reduced to form gaseous Nitrogen. Other biological anoxic/anaerobic reaction processes may evidently occur within the lower reaction zone (31) according to the invention. Other examples may comprise the biological degradation of micro-organic pollutants which are often a problem in water treatment processes.

The microbial processes within the upper aerobic reaction zone (32) may in an embodiment of the invention comprise the nitrification of compounds within the feedwater such that ammonia $NH_3$ reacts to form nitrite and nitrate. Other biological aerobic reaction processes may evidently occur within the upper reaction zone (32) according to the invention.

The volumetric proportions of the lower and upper reaction zones (31, 32) to each other may be chosen freely according to the feedwater composition and the desired reaction and effluent quality.

After having passed through the upper reaction zone (32) the feedwater has thus undergone both an anoxic/anaerobic reaction and an aerobic reaction within a single reactor volume.

For aerating the upper aerobic reaction zone (32) a bubble diffuser (7) is arranged for releasing oxygen comprising bubbles such that the biological oxygen demand of the feedwater is met and the aerobic reaction may take place. The bubble diffuser (7) may have any adapted constitution and a plurality of examples is given in the art. The bubble diffuser (7) may in an embodiment of the invention release bubbles having a rather small diameter, being thus arranged for not having a too great shearing effect upon the biofilm comprised within the upper reaction zone (32) Further, it will provide an increased oxygen-biofilm contacting area compared to using coarser bubbles. If needed the bubble diffuser (7) should also be arranged to periodically be able to provide a larger amount of bubbles such that the biofilm media within the upper aerobic zone may slough off excess biofilm growth and the detached excess biofilm will move downwards to the lower anaerobic/anoxic zone.

The bubbling of air through the upper reaction zone (32) may further result in a mixing of the upper reaction zone (32) ensuring that there is a circulation of fluid within the reaction zone (32), allowing mixing to take place. This is of importance to ensure that the reactor volume is used in an efficient manner.

Figure 2:
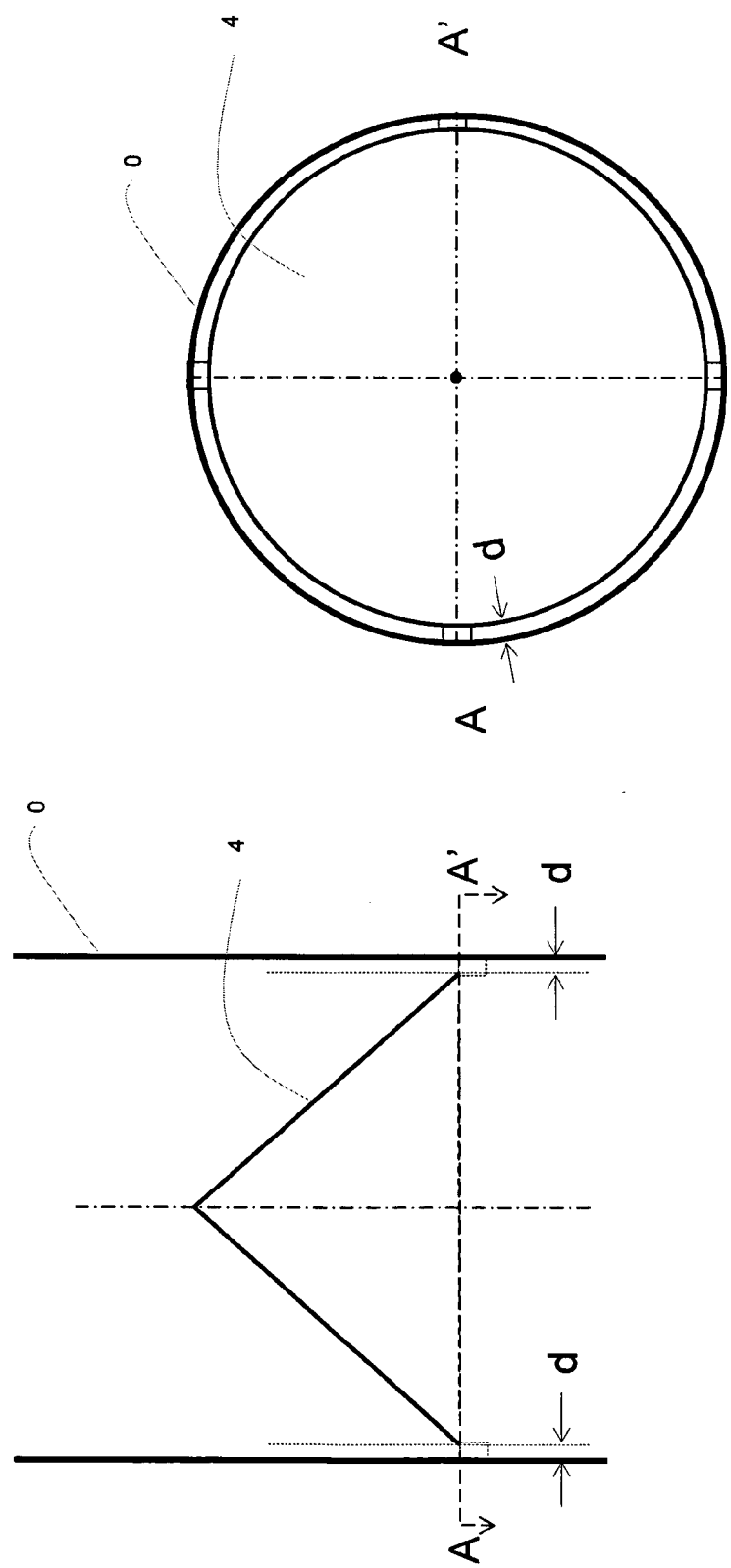
FIG. 2 is a vertical section along a line A-A' of an embodiment of the invention having a conical separator structure (4) arranged concentrically with a central axis of the reactor tank (0), and a horizontal
Figure 3:
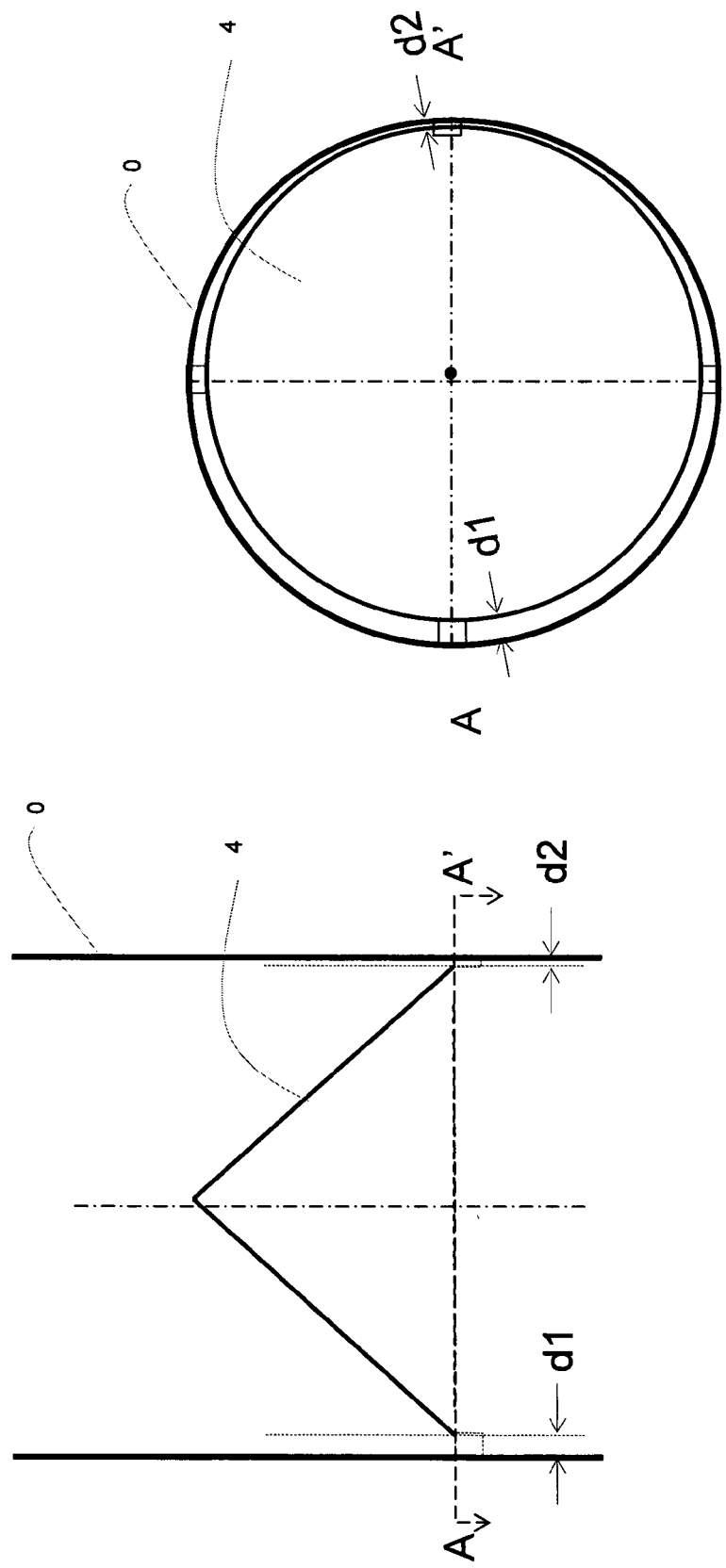
FIG. 3 is rather similar to FIG. 2 except for the separator structure being arranged asymmetrically, displaced to reside nearer to one of the vertical walls.
Figure 4:
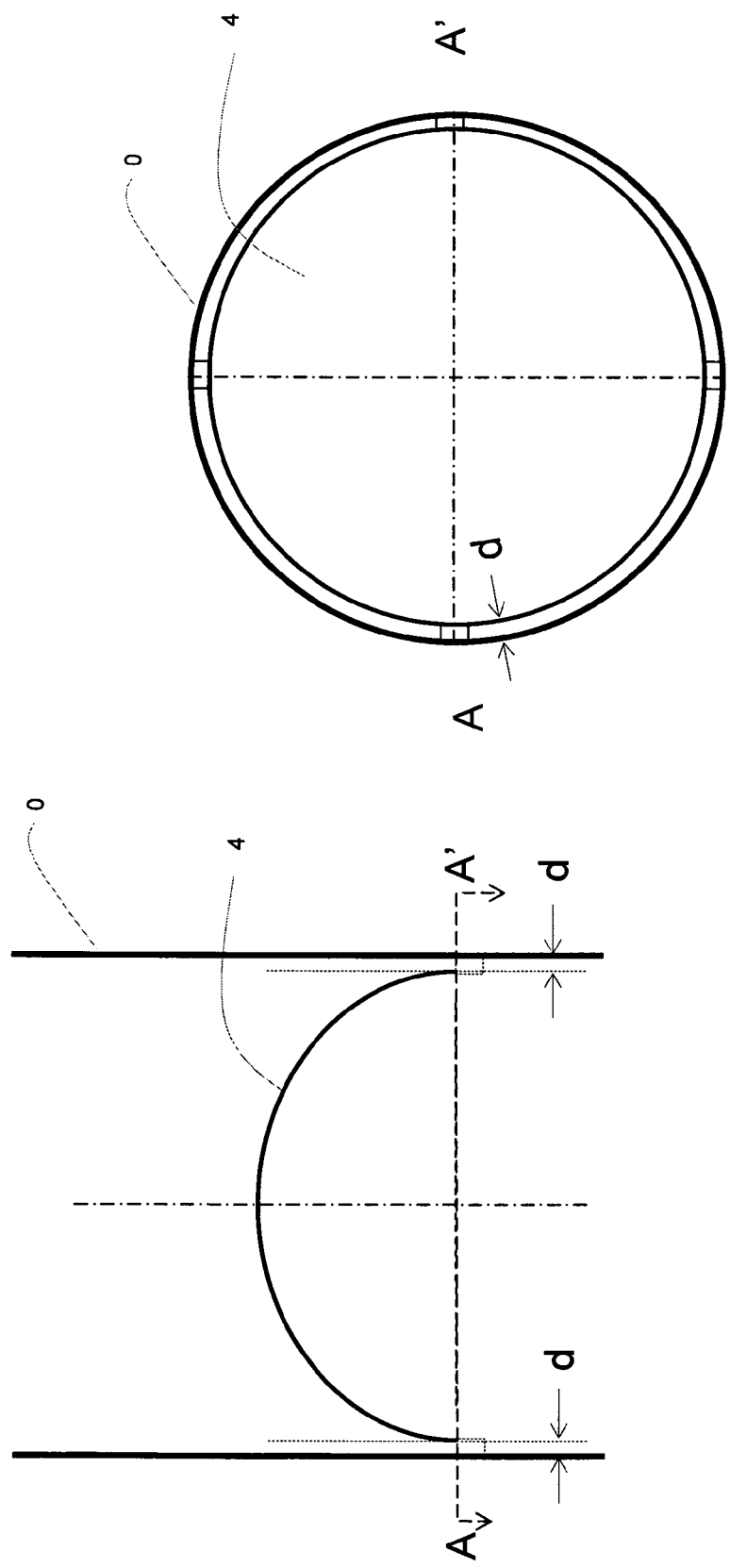
FIG. 4 illustrates a dome-shaped separator structure.
Figure 5:
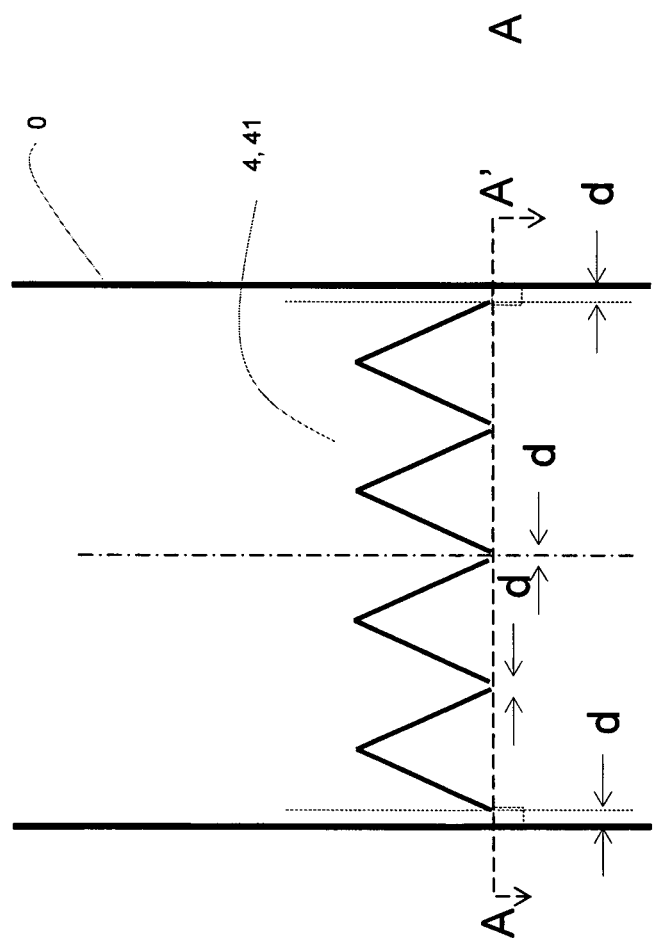
FIG. 5 illustrates a separator structure comprising several separator substructures.

The separator structure (4) serves a plurality of functions as mentioned above. The shape of the separator is of some importance to ensure that it will perform the various functions in an adequate manner. The separator should have an upwardly tapered or dome shape such that biological material does not accumulate on the upper surface of said reactor. The angle of inclination of the separator structure (4) may be varied according to the size of biological flocks settling down from the upper reaction zone (32) and according to the flow regime which is to occur around the separator structure (4). The separator structure (4) may according to an embodiment of the invention have an angle varying between about 20° to about 70°. The separator structure (4) should also hinder the movement of anoxic/anaerobic sludge into the aerobic reaction zone (32). If the sludge comprised in the lower reaction zone (31) is entrained into the upper aerobic reaction zone the reactor will evidently function less well, and this will undesirably incur a significant increase of suspended solid concentration in the effluent. The separator structure (4) should thus be of a size and shape to hinder such anoxic/anaerobic sludge movement. Correspondingly, the separator structure (4) should hinder the oxygen diffusion from being to large from the upper aerobic reaction zone (32) down into the lower anoxic/anaerobic reaction zone (31). There will evidently be some flow down towards the lower reaction zone (31) thus providing oxygen to the anoxic/anaerobic zone, however due to the shape of the separator structure (4) the oxygen diffusion will be reduced. Thus the separator structure (4) will function as a hydrodynamic separator between the lower and upper reaction zones (31, 32), as an oxygen diffusion control, and as a sludge trap preventing sludge from rising to the upper, aerobic zone (32). Amongst the various shapes that may be envisaged for the separator structure (4) are upwardly tapered roof-like shapes or upwardly cones, upwardly convex domes, and other structures having an upper, fluid-tight surface generally allowing biological matter falling from above to be guided in the sideward and downward direction while allowing fluids from the lower, anaerobic zone to pass upwards, to the side of said upper surface of the separator structure (4). However, any suitable separator geometry should be considered as being within the scope of the invention if guiding biological matter downwards to the anaerobic/anoxic zone while preventing oxygen to diffuse to the anaerobic/anoxic zone while guiding fluid flows upwards from the anaerobic/anoxic zone. The separator structure (4) will in an embodiment of the invention be arranged about a centre axis of the reactor, please see FIGS. 1 and 2, although it may also be arranged in closer proximity to a first wall of the tank than to a second, opposite wall, please see FIG. 3. Other embodiments of the invention may use a dome-shaped separator structure, such as illustrated in FIG. 4. In other embodiments of the invention it may be used a plurality of separator structures in parallel in array in the same reactor. The gaps (d) between the separator structures (if several are used in parallel) or between the separator and the tank wall, must be sufficiently large (more than 7 mm from the experiments) to allow for the exchanges of the aerobic biomass moving downwards and water and other fluids flowing upwards past the separator. The separator structures may cover 70%-90% or more of the cross-sectional area of the reactor. The gap (d) should also not be too large, it should be less than 25% of reactor width for the small tank used in the laboratory experiment, and less for large diameter tanks. Given the functioning of the reactor wherein the mixing of the different reaction zones (3) should be reduced, it is furthermore clear that a relatively low superficial velocity of liquid upflow should be used in the invention. The superficial velocity of the liquid upflow should thus stay within about 0.001 cm/min and 3.5 cm/min, although higher flow velocities may be envisaged.

One should furthermore aim to reduce the amount of biological material in the effluent, as this will according to the present invention probably be the major source of total suspended solids in the effluent. Having a too high flow velocity or having a too violent bubbling action could result in a rising value of total suspended solid in the effluent by entrainment of biological material from the biofilm media.

The flow pattern within the reactor is in reality somewhat more complicated than the simple throughput of water from the lower portion of the reactor to the effluent outlet at the upper portion of the reactor. There will be backmixing due to the settling movement of the aerobic biological material, there will be a complex flow pattern around the separator wherein feedwater having flowed past the separator structure (4) will pass close to the reactor wall, and return water from the upper portion of the reactor will pass along the separator plates down into the lower reaction zone (31). There will be mixing within both the upper (32) and lower (31) reaction zones as well. This mixing and return flow within the reactor will result in the feedwater passing from the lower reaction zone (31) to the upper reaction zone (32) a number of times before exiting the reactor as treated effluent. If needed a recycle line (8) may further be arranged such that the effluent is recycled back to the feedwater inlet (1) for further treatment. The percentage of effluent to be recycled may be varied according to need and according to the desired treatment degree of the feedwater. Measurements of amongst others ammonia content and oxygen demand may be among the parameters influencing the degree of recycling.

There has been mention throughout of the upper and lower reaction zones (3), as is shown in FIG. 1 of the present application. Although being shown as being mainly vertical, it is evident that the reactor as such may be inclined as long as there is sufficient vertical reactor inclination to allow the biological material from the upper reaction zone (32) to settle into the lower reaction zone (31). In order for constructing an inclined reactor such as described above it is evident that the separator structure (4) should also be modified in order for adapting to the modified reactor lay out.

The reactor as described in the present invention may be run in batch mode or continuous mode according to the operational specifications of the feedwater treatment.

Thus the present invention describes both a reactor as such, and a method for treating the contaminated feedwater such that it may later be treated to emission water of high standards, suitable for secondary and tertiary treatment, or further to comply with wastewater reuse standards.

Exemplary Embodiment of the Invention

The reactor according to the invention has been verified experimentally in a laboratory-scale biological reactor to evaluate the degree of suspended solid control and the reduction of amount of excess aerobic sludge. The biological reactor and the separator structure were constructed from high-grade transparent acrylics. A biofilm media made of HDPE, was filled in the upper aerobic zone with the filling fractions for the biofilm media of approximately 50% of the chamber volumes giving effective specific surface areas of $250 \text{ m}^2/\text{m}^3$. The biofilm media were shaped as short cylinders having internal crosses and external wavy fins. The air flow rate for aeration in the biofilm chamber was 1 L/min. The biofilm chamber was enclosed by perforated plates with 5 mm diameter holes arranged for retaining the media. The anaerobic activated sludge was filled in the lower chamber. The total suspended solid concentrations of the anaerobic activated sludge were in a range of 6.2-8.7 g/L with solid retention time (SRT) of 21 days. The effective volumes of the aerobic biofilm chamber and anaerobic activated sludge zone in the invention were about 1.6 L and about 2.2 L, respectively. The aerobic biofilm zone and anaerobic activated sludge zone chamber of the invention theoretically contributed approximately 33% and 66% to the overall hydraulic retention time, respectively. The liquid flow of wastewater spent more hydraulic retention time in the chamber of anaerobic activated sludge. The superficial liquid velocities in the invented vertical biological reactor ranged from about 0.05 to about 0.1 cm/min. The dividing plate constituting the separator structure (4) used in the laboratory experiment according to the invention covered approximately 88% of the cross-sectional area of the reactor and had a roof-like shape with a 38° angle slope to a horizontal line. The gaps between the separator structure's edges and the reactor walls were 7 mm.

The experiment was aimed at investigating the strategy to control the suspended solid concentrations. The effect of liquid upflow velocities and the hydraulic retention times (HRT) on the suspended solid concentrations was determined. Municipal wastewater from Trondheim community used was pre-treated by a gravity settler, and then the overaverage TSS concentration was reduced to 14.3 mg/L which was very low compared to typical effluents at approximately 200 mg/L for the biofilm reactant and 350 mg/L for activated sludge biological reactor with a particle settler. Removal of colour, DOC, ammonia, total nitrogen, and UV absorbances in the effluents at HRT of 5.2 and 8.3 h were relatively similar. High removal rates of suspended solids and turbidities were achieved at HRT of 8.3 hours which were 87.5% and 92% for suspended solid rejection and turbidity rejection by the invented biological reactor, respectively. The effluent from the reactor according to the invention at HRT of 8.3 hours was much clearer than that at HRT of 5.2 hours. Reduction in conductivity in Table 1 shows that anaerobic part mainly removed inorganic salts in the wastewater influent. SUVA @ 254 and specific spectral absorbance at 436 nm in the effluent at HRT of 8.3 hours were different than those in the influent and those in the effluent at HRT of 5.2 hours. Increases in SUVA referred to some molecular changes of organic substances after biodegradations in the invented biological reactor.

TABLE 1

Average characteristics of influent wastewater and removal rates in effluents from the vertical biological reactor at 5.2 and 8.3 hours HRT

| Characteristics | Influent to the bioreactor | Effluent from the bioreactor | | | |
|---|---|---|---|---|---|
| | | HRT at 5.2 h | | HRT at 8.3 h | |
| | | Value | % Removal | Value | % Removal |
| Chemical oxygen demand—COD (mg $O_2$/L) | 273.4 | 89.7 | 67.2 | 56.1 | 79.5 |
| Filtered chemical oxygen demand—FCOD (mg $O_2$/L) | 135.2 | 52.4 | 61.2 | 27.6 | 79.6 |
| Total suspended solid—TSS (mg/L) | 114.7 | 46.1 | 59.8 | 14.3 | 87.5 |
| Total organic carbon—TOC (mg/L) | 73.6 | 27.2 | 63.0 | 19.9 | 73.0 |
| Dissolved organic carbon—DOC (mg/L) | 42.4 | 17.8 | 58.0 | 13.1 | 69.1 |
| Turbidity (NTU) | 89.3 | 19.6 | 78.1 | 7.1 | 92.0 |
| N—$NH_3$ (mg/L) | 29.7 | 22.5 | 24.2 | 21.2 | 28.6 |
| Total nitrogen (TKN) (mg/L) | 41.3 | 34.2 | 17.2 | 28.6 | 30.8 |
| UV absorbance at 254 nm - $UV_{254}$ ($m^{-1}$) | 42.2 | 28.6 | 32.2 | 27.3 | 35.3 |
| Spectral absorbance at 436 nm - $UV_{436}$ ($m^{-1}$) | 2.1 | 1.8 | 14.3 | 1.6 | 23.8 |
| Specific UV absorbance at 254 nm - SUVA@254 nm (L/m · mg) | 0.99 | 1.6 | — | 2.0 | — |
| Specific spectral absorbance at 436 nm (L/m · mg) | 0.050 | 0.101 | — | 0.122 | — |
| Conductivity (µS/cm) | 1016 | 804 | — | 781 | — |
| pH | 7.34 | 8.15 | — | 8.29 | — |
| Colour (mg Pt/L) | — | 56.4 | — | 47.1 | — | flow from the settler was pumped to the biological reactor. A MasterFlex computerized peristaltic pump with speed control of ±0.25% was used to control the flowrate of the wastewater. National Instrument DAQ card: USB 6210 and LabVIEW 8.2 were used for experimental data collections.

Effect of Liquid Upflow Velocities and Hydraulic Retention Times (HRT) on Effluent Quality from the Vertical Biological Reactor The total suspended solid (TSS) concentrations and residual organic characteristics in the effluent from the invented biological reactor are dependent on the liquid upflow velocities in the invention. Low superficial liquid upflow velocities used were 0.099 cm/min at HRT of 5.2 h and 0.062 cm/min at HRT of 8.3 h. Table 1 shows the average characteristics of wastewater and effluents from the vertical biological reactor at HRTs of 5.2 and 8.3 hours. The concentration of total suspended solid, FCOD, and turbidity in the effluents at HRT of 8.3 h was significantly lower than that at HRT of 5.2 h. At HRT of 8.3 h or the upflow velocity of 0.062 cm/min, The reduction of the excess aerobic sludge volume in an embodiment of the reactor tank according to the invention was preliminarily evaluated by a conventional method. Comparisons in the sludge accumulation (height) rates of the excess sludge falling from the upper aerobic zone into the lower anoxic/anaerobic zone with and without the separator structure can be reasonably used for this preliminary test. Without the separator structure, anaerobic conditions did not establish in the lower zone due to oxygen diffusing downwards. The height of the sludge in the lower anaerobic zone without the separator structure had increased with average speed (in 8 days) of approximately 1.2 cm/day, and the settled sludge flocs had a loose packing density. However, after the separator structure was installed, anaerobic conditions were established in the lower anaerobic zone. Sludge characteristics had changed where the sludge colour was noticeably darker with higher density of the accumulated sludge. A slight rise in the sludge level in the chamber was found after the third day. The average increase rate of the sludge height with the separator was approximately 13-16 times lower than the increase rate without the presence of a separator structure and anaerobic digesting conditions.

According to the reactor of the present invention the overall sludge production will be lower than for comparable methods according to the background art. This is of importance as sludge handling is costly in order for rendering the resulting sludge disposable. There will furthermore be less need for sludge pumping as the excess aerobic sludge from the upper reaction zone (32) will simply settle down into the lower anoxic/anaerobic reaction zone and form part of the sludge comprised therein. The design of the reactor will allow for longer sludge residence time further reducing the excess aerobic sludge volume, and thus reduce the cost of sludge handling.

Due to the flow pattern of the reactor wherein the flow is mainly upwardly directed, the feedwater first passing through the lower anoxic/anaerobic reaction zone, the resulting effluent from the reactor will have a lower total suspended solid than in comparable methods of the background art. This allows for a plurality of benefits amongst which are less problems with clogging in the aerobic reaction zone (32), evidently less total suspended solids in the effluent which may necessitate further treatment of the effluent and particularly that there will be less need for aeration of the aerobic reaction zone (32). As a major proportion of the energy costs associated with feedwater handling is due to the need for pumping air for meeting the biological oxygen demand of the feedwater, the savings upon using a reactor according to the present invention are substantial. Further benefits of the reactor according to the present invention include less need of post treatment with less water and chemical consumptions upon post treatment of the effluent. This is of particular interest from the environmental point of view.

The reactor is of particular interest when applied to industrial or municipal wastewater handling. The feedwater volumes that are required to be treated in such applications are very large thus there is a major incentive to reduce all cost associated with handling such feedwaters. Other applications include treating specific drinking water applications, or the treatment of feedwater from agriculture or aqua culture applications.

A plurality of reactors according to the invention may be arranged in parallel such that a feedwater plant may treat large volumes of feedwater. A modular arrangement presents a number of advantages allowing for ease of inspection and replacement of malfunctioning elements or single tanks. In the embodiment wherein the reactors are arranged mainly vertically this may allow for a feedwater plant having a small footprint, thus further reducing the area requirements and thus the capital costs of the plant.

The reactor as such may be used for the biological treatment of any feedwater such as for instance municipal and industrial wastewaters. The biological composition of the both the sludge comprised within the lower reaction zone (31) and the composition of the upper reaction zone (32) is largely adaptable to adjust to the treatment needs of a variety of wastewater compositions.

The reactor according to the invention may also be used in ships. In several sea areas of the world, discharge of wastewater is not advisable or even forbidden due to legislation for environmental considerations. A ship leaving port with a reactor tank according to the invention may treat the wastewater from passenger and crew activities in the reactor tank while at sea and discharging or further purifying the effluent on site if needed, and keeping the sludge. The sludge produced will be of far smaller volume than the wastewater. When arriving in port the collected sludge may be removed from the tank and transported to an onshore facility, thus significantly reducing the pollution of the waters during the ship's transit.

The invention claimed is:

1. A reactor tank for the biological treatment of feedwater, said reactor tank comprising:
   an upper, aerobic reaction zone and a lower anoxic/anaerobic reaction zone, wherein the upper, aerobic reaction zone contains a bed that is maintained in place by an upper screen and a lower screen,
   one or more feedwater inlets in the lower anoxic/anaerobic reaction zone,
   one or more effluent outlets in the upper, aerobic reaction zone, wherein the feedwater is subject to treatment within both the lower anoxic/anaerobic reaction zone and the upper, aerobic reaction zone, said upper, aerobic reaction zone being provided with aerated biofilm media for forming substrates for growth and release of biological matter, said lower anoxic/anaerobic reaction zone contains an activated sludge or biofilm media, wherein the sludge volume changes with purging of the sludge, and
   a separator structure arranged between the upper, aerobic reaction zone and the lower anoxic/anaerobic reaction zone, wherein the separator structure permits the upwards passage of fluids from the lower anoxic/anaerobic reaction zone to the upper, aerobic reaction zone, and prevents oxygen from entering the lower anoxic/anaerobic reaction zone, wherein said separator structure further has a generally inclined upper surface that guides said released biological matter from the upper, aerobic reaction zone to the lower anoxic/anaerobic reaction zone, where said biological matter is further processed and sludge is collected and removed only from the lower anoxic/anaerobic reaction zone through a sludge outlet.

2. The reactor tank of claim 1 wherein said lower anoxic/anaerobic reaction zone comprises an activated sludge for the anoxic/anaerobic decomposition of biological material or biomass from the upper, aerobic reaction zone.

3. The reactor tank according to claim 1, wherein said aerated biofilm media are provided with oxygen through injection of air through a bubble diffuser arranged below said upper, aerobic reaction zone.

4. The reactor tank according to claim 3, wherein said bubble diffuser is arranged for releasing bubbles having a small diameter.

5. The reactor tank of claim 1 wherein said biofilm media are arranged for releasing said biological material in a generally downwards direction upon the completion of a growth cycle on the biofilm media.

6. The reactor tank of claim 5 wherein said biofilm media are arranged to be fluidized within the upper, aerobic reaction zone.

7. The reactor tank of claim 6 wherein said biofilm media are arranged for being mechanically restricted to reside within the upper, aerobic reaction zone.

8. The reactor tank according to claim 1 wherein a recirculation line is arranged for the recirculation of at least a portion of the effluent from the upper portion of the reactor tank to the lower portion of the reactor.

9. The reactor tank according to claim 1, said separator structure comprising an assembly of two or more separator substructures.

10. A method of treating a municipal wastewater stream, comprising receiving said municipal wastewater stream through one or more inlets at a lower portion of the reactor tank according to claim 1.

11. A method of treating an industrial wastewater stream, comprising receiving said industrial wastewater stream through one or more inlets at a lower portion of the reactor tank according to claim 1.

12. A method of treating an agricultural wastewater stream, comprising receiving said agricultural wastewater stream through one or more inlets at a lower portion of the reactor tank according to claim 1.

13. A method of treating an aquaculture wastewater stream, comprising receiving said aquaculture wastewater stream through one or more inlets at a lower portion of the reactor tank according to claim 1.

14. A method for biological treatment of feedwater in a reactor tank comprising:
receiving said feedwater through one or more feedwater inlets in a lower portion of said reactor tank, wherein the lower portion of the reactor tank contains a lower anoxic/anaerobic reaction zone,
removing effluents through one or more effluent outlets at an upper portion of said reactor tank, wherein the upper portion of the reactor tank contains an upper, aerobic reaction zone, said feedwater being subject to treatment within both the lower anoxic/anaerobic reaction zone and the upper, aerobic reaction zone which are separated by a separator structure,
removing sludge from the lower anoxic/anaerobic reaction zone through a sludge outlet,
wherein said upper, aerobic reaction zone is provided with biofilm media that form substrates for growing and releasing biological matter, and wherein said separator structure permits the upwards passage of fluids from the lower anoxic/anaerobic reaction zone to the upper, aerobic reaction zone, and prevents oxygen from entering the lower anoxic/anaerobic reaction zone,
characterized in that an inclined upper surface of said separator structure guides said released biological matter from said upper, aerobic reaction zone to the lower anoxic/anaerobic reaction zone which further processes said biological matter to form sludge that is collected and removed only from the lower anoxic/anaerobic reaction zone.

15. The method according to claim 14, allowing sludge collected in said lower anoxic/anaerobic reaction zone to leave said reactor tank through a sludge outlet from a lower portion of said reactor tank.

16. The method according to claim 14 wherein said biological treatment comprises a nitrification process in said aerobic reaction zone, and a denitrification process in said lower anoxic/anaerobic reaction zone.

17. The method of claim 14, wherein said lower anoxic/anaerobic reaction zone comprises an activated sludge.

18. The method according to claim 14 aerating said upper, aerobic reaction zone through a bubble diffuser.

19. The method according to claim 18, wherein said bubble diffuser releases bubbles that do not have a shearing effect on the biofilm media.

20. The method according to claim 14, wherein said aerobic biofilm media are circulated within said upper, aerobic reaction zone.

21. The method according to claim 14, wherein said superficial liquid upflow velocity within said lower anoxic/anaerobic reaction zone is within the range of about 0.0005 cm/s to about 4 cm/s.

22. The method according to claim 14, wherein at least a portion of said effluent stream is recycled through a recycling line for a further treatment within said reactor tank.

* * * * *